United States Patent [19]

Sajben

[11] Patent Number: 4,879,895
[45] Date of Patent: Nov. 14, 1989

[54] NORMAL SHOCK LOCATOR

[75] Inventor: Miklos Sajben, Chesterfield, Mo.

[73] Assignee: McDonnell Douglas Corporation, Long Beach, Calif.

[21] Appl. No.: 237,073

[22] Filed: Aug. 29, 1988

[51] Int. Cl.$^4$ .............................................. G01L 27/00
[52] U.S. Cl. ...................................... 73/4 R; 137/15.1
[58] Field of Search ...................... 73/115, 116, 117.3, 73/865.8, 4 R; 60/39.29; 137/15.1, 15.2; 364/558

[56] References Cited

U.S. PATENT DOCUMENTS

| | | | |
|---|---|---|---|
| 2,853,852 | 9/1958 | Bodine, Jr. | 60/35.6 |
| 2,920,446 | 1/1960 | Ranard | 60/35.6 |
| 2,971,329 | 2/1961 | Barry | 60/35.6 |
| 2,971,330 | 2/1961 | Clark | 60/35.6 |
| 2,989,846 | 6/1961 | Hausammann | 60/35.6 |
| 3,102,387 | 9/1963 | Casper et al. | 60/35.6 |
| 3,163,981 | 1/1965 | Goodall et al. | 60/35.6 |
| 3,181,818 | 5/1965 | Pearl | 244/53 |
| 3,450,142 | 6/1969 | Barry | 137/15.2 |
| 3,460,554 | 8/1969 | Johnson | 137/15.2 |
| 3,799,475 | 3/1974 | Mitchell et al. | 244/53 |
| 3,911,260 | 10/1975 | Dustin | 60/39.29 |
| 4,051,712 | 10/1977 | Zias et al. | 73/4 R |
| 4,182,158 | 1/1980 | Culotta et al. | 73/4 R |
| 4,255,938 | 3/1981 | Norris et al. | 62/268 |
| 4,749,331 | 6/1988 | Blotenberg | 73/116 |

Primary Examiner—Robert R. Raevis
Attorney, Agent, or Firm—Curt L. Harrington; George W. Finch; John P. Scholl

[57] ABSTRACT

Disclosed is an apparatus and method for locating the position of a normal shock in a fluid flowing in a duct.

21 Claims, 1 Drawing Sheet

NORMAL SHOCK LOCATOR

BACKGROUND OF THE INVENTION

Air breathing propulsion systems operating at high Mach numbers must use mixed-compression inlets in which the terminal shock, i.e. the beginning of subsonic flow, is located downstream of the inlet throat. The operation, and hence the control, of such propulsion systems critically depends on the streamwise position of the shock. Currently, there exists no reliable sensor of sufficient simplicity to provide terminal shock information to the engine control system.

Under laboratory conditions, it is possible to use a streamwise array of fast-response pressure transducers which are flush mounted on the inner wall of the flow channel. The transducers are placed to span the range of expected terminal shock locations. This laboratory system delivers an instantaneous pressure distribution, from which the terminal shock position is determined by locating the abrupt pressure rise associated with the terminal shock.

This system is damage prone and requires frequent calibration. The signal interpretation is both complicated and highly dependent upon flight conditions. It is therefore not well suited to the aerospace environment. Other techniques, such as optical methods and hot-film-based methods are also available, but they are only suitable for laboratory use.

SUMMARY OF THE INVENTION

The shock position indicator apparatus and method of the present invention is constructed from simple, rugged components, all of which are currently available. The shock position indicator uses only two pressure transducers. The two pressure transducers need only have a frequency response of up to one kilohertz and need not be particularly precise in order to function properly. The transducer sensitivities need not be known, but the sensitivities must remain constant throughout the duration of the flight. The transducers are not exposed to the airstream and are thus protected from damage.

The invention takes advantage of the inevitably present streamwise oscillations (jitter) of the terminal shock. The frequency of jitter is normally much higher than terminal shock motion induced by flight condition or control changes.

The signal interpretation requires few steps and does not depend upon the flight condition. The shock position indicator provides two outputs to indicate shock position. Any difference between the two when a shock is not present is a measure of system errors. Therefore the device and technique of the present invention has a built-in redundancy.

BRIEF DESCRIPTION OF THE DRAWINGS

The structure and method of operation of the invention, together with additional advantages thereof, will be best understood from the following description of specific embodiments when read in connection with the accompanying drawings, in which.

DETAILED DESCRIPTION OF THE PREFERRED EMBODIMENT

Figure 1:
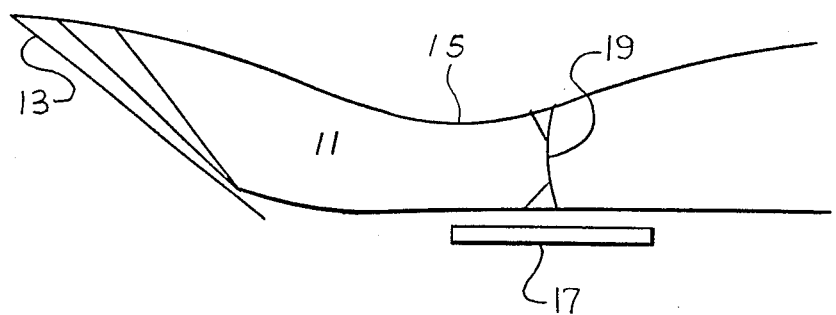
FIG. 1 is a side view representation of a typical air inlet in which the apparatus of the present invention is to be deployed.

A longitudinal section of a mixed compression inlet typical of a high performance jet aircraft is illustrated in FIG. 1. The inlet admits a stream of supersonic air which flows from left to right in the reader's perspective. The inlet duct 11 typically has a throat 15 which tends to restrict air flow into the remaining portion of duct 11. The location of the shock position indicator is denoted generally as 17 and is located adjacent duct 11 as indicated in FIG. 1. The location of shock position indicator 17 will depend upon the geometric characteristics of duct 11 which dicatate the range over which the terminal shock may be located. A vertically oriented terminal shock 19 is illustrated within duct 11 and the adjacent location of shock position indicator 17.

Figure 2:
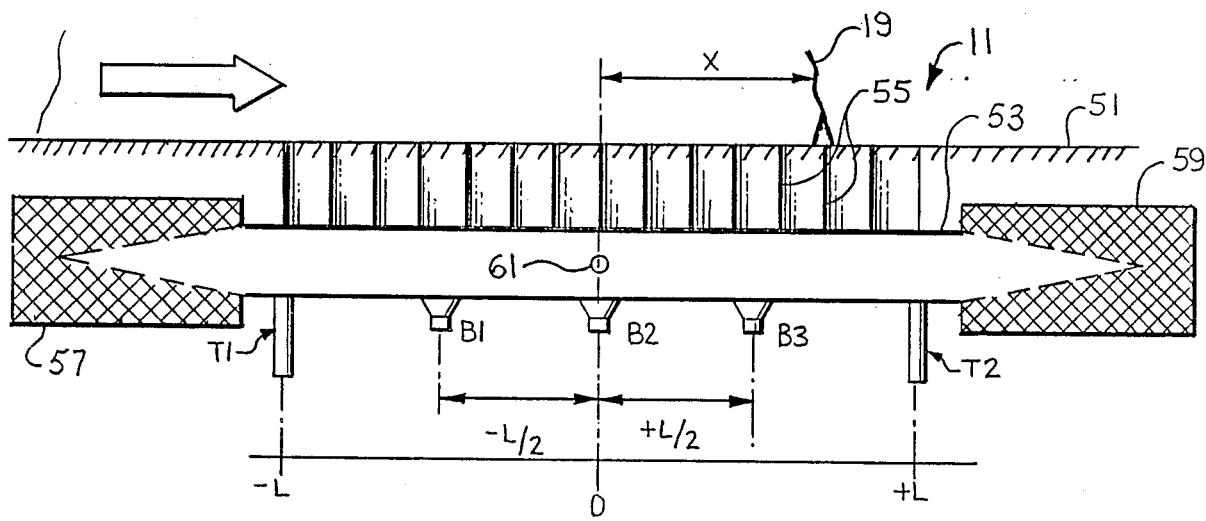
FIG. 2 is an enlarged view of that portion of FIG. 1 which contains a detailed illustration of the apparatus of the present invention; and, FIG. 3 is a diagram of the system incorporating the shock position apparatus of FIG. 2 into a shock location system.

A more detailed illustration of the shock position indicator 17 of FIG. 1 is given in FIG. 2. Duct 11 of FIG. 1 is shown having an inside wall 51. An arrow indicates the direction of air flow along wall 51. An elongated cavity 53 is situated parallel to duct 11. Typically, elongated cavity 53 will be embedded in wall 51 as is shown. The volume within elongated cavity 53 is in fluid communication with the volume within duct 11 by means of a series of connecting tubes 55. The left side of elongated cavity 53 is terminated by a sound absorbing termination 57. Similarly, the right side of elongated cavity 53 is terminated by a sound absorbing termination 59. Pressure transducer T1 is in pressure communication with the left portion of elongated cavity 53. Similarly, pressure transducer T2 is in pressure communication with the right portion of elongated cavity 53.

As is shown in FIG. 2, the pressure transducers are located equidistant from the center of elongated cavity 53. Pressure transducer T1 is located a distance of L upstream from the center of elongated cavity 53. Similarly, pressure transducer T2 is located a distance of L downstream from the center of elongated cavity 53. Three small beepers B1, B2, and B3 are located along the inner portion of elongated cavity 53. Beeper B2 is located at the center of elongated cavity 53. Beeper B1 is located along elongated cavity 53 at a point mideay between the center of elongated cavity 53 and the location of pressure transducer T1. By the coordinates shown in FIG. 2, beeper B2 is located a distance of L/2 upstream from the center of elongated cavity 53. Similarly, beeper B3 is located a distance of L/2 downstream from the center of elongated cavity 53. A thermocouple 61 is in temperature communication with elongated cavity 53.

The spacing of connecting tubes 55 will determine the spatial resolution of the shock position indicating system. The shape of the cross section of elongated cavity 53 will not affect the output of sensors T1 and T2 and therefore may be chosen for convenience. Sound absorbing terminations 57 and 59 may be made of any material so long as the intensity of the reflected wave from the respective sound absorbing termination is no more than approximately eighty percent of the arriving wave intensity. In other words, the reflection coefficient should be below 0.8.

Figure 3:
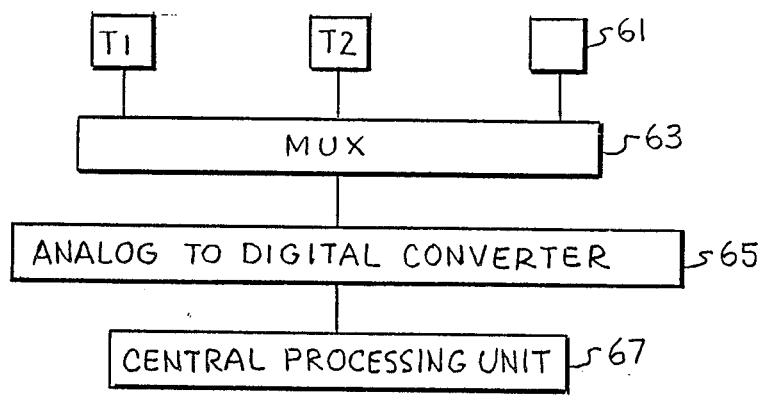

Referring to FIG. 3, pressure sensors T1 and T2 and the thermocouple 61 are connected to a multiplexer (MUX) 63. MUX 63 selects which of the pressure sensors T1 or T2 or the thermocouple 61 are to have their signals sensed. MUX 63 is connected to an analog to digital converter 65 where the analog signals from the selected sensor are digitized. The digitized signal from analog to digital converter 65 is conducted to a central processing unit 67. The central processing unit 67 may be a microprocessor or central computer capable of carrying out mathematical calculations.

The operation of the method and apparatus of the present invention is based upon the fact that terminal shocks are never completely steady. Terminal shocks always oscillate at relatively low frequencies determined by the longitudinal dimensions of the duct 11. Fluctuating surface pressure measurements indicate that the root mean square fluctuating intensity has a sharp peak at the shock location. This peak has an intensity of from four to six times the values found on either side of the shock.

Referring to FIG. 2, shock 19 in duct 11 displays a local fluctuation associated with small displacement and large pressure amplitudes. This local fluctuation is communicated to elongated cavity 53 via the nearest connecting tubes 55. The ends of the connecting tubes 55 act as sound sources within elongated cavity 53. Sound travels from the end of each connecting tube 55 toward each end of elongated cavity 53 and arrives at each of the pressure transducers T1 and T2 after a time proportional to the distance travelled. If a sound pulse is introduced at some point other than the center of elongated cavity 53 (zero point on FIG. 2), then there will be a time delay between the two signals from pressure transducers T1 and T2.

Similarly, if a pure tone sound is introduced through any of the connecting tubes 55 or produced from the beepers B1, B2 and B3, a phase shift will exist between the signals from pressure transducers T1 and T2. The time delay or the phase shift will allow computation of the connecting tube 55 having the most sound activity. The connecting tube 55 with the most sound activity will indicate the position within duct 11 of the presence of shock 19.

The speed of sound in a gaseous fluid is dependent upon temperature only and is determined from the temperature signal emanating from the thermocouple 61. Ideal operation would be under circumstances wherein the terminations 57 and 59 are perfectly absorbing. In reality, where terminations 57 and 59 absorb partially, a standing wave pattern is established in elongated cavity 53. One-dimensional acoustic theory can be used to describe this pattern as a parametric function of the sound source location, the frequency of excitation and the reflection coefficient of terminations 57 and 59.

The theory of operation is as follows. The sound field inside the elongated cavity 53 is described as the superimposition of rightwardly moving and leftwardly moving single frequency waves. These waves are the real part of the following complex expression:

$$\underline{P}_{(x,t)} = (\underline{P}_r e^{+ikx} + \underline{P}_1 e^{-ikx}) e^{-iwt}$$

Where $\underline{P}_{(x,t)}$ is the pressure disturbance as a function of position (x) and time (t).;

$\underline{P}_r$ is the amplitude of the rightward moving wave;

$\underline{P}_1$ is the amplitude of the leftward moving wave;

k is the ave number, equal to w/a w is the circular frequency $2\pi$ f;

f is the frequency of the sound wave; and, a is the speed of sound in the air cavity defined by the relationship:

$$a = \sqrt{\gamma RT}$$

where $\gamma$ is the ratio of specific heats, which for air is about 1.4;

R is the ideal gas law constant, in the MKS system, equal to 287 $m^2 s^{-2} K^{-1}$, and T is the absolute temperature in degrees kelvin.

The reflection coefficient at either end is defined as the ratio of the reflected pressure disturbance amplitude to the amplitude of the incident pressure disturbance. Phase delays are possible, causing the reflection coefficient to be a complex quantity. The reflection coefficient in the complex domain is represented by:

$$\underline{R} = Re^{i\theta}$$

The principal quantity to be measured is the ratio of pressure oscillatons at position x=+L and position x=−L. This ratio $\underline{Q}$, is defined as $$\underline{Q} = \frac{\underline{P}(+L,t)}{\underline{P}(-L,t)}$$

Analysis is simplified by using the following normalized variavble for position and circular frequency:

$$s = \frac{x}{L}$$

$$v = \frac{wL}{a}$$

The operation of the device involves three distinct modes: (a) determination of transducer gain ratio, (b) reflection coefficient determination, and, (c) measurement of sound source location. This sequence corresponds to that encountered in use. The explanation of the modes, however, is more logical if the discussion follows a reverse order.

(c) Measurement of sound source location

The measurement consists of determining the ratio of the pressure disturbances at the two transducers T1 and T2, i.e. measuring the quantity $\underline{Q}$. Once obtained, the desired location is determined from the expression:

$$e^{i2ws} = \frac{1 - \underline{Q}Re^{i2w}}{\underline{Q} - Re^{i2w}}$$

The location s is a real number that can be determined from either the real or the imaginary part of this complex equation. The two results should be equal. Any deviation from equality is a measure of system error and may be used to verify the correct operation of the system.

The determination of s requires only the ratio of the two pressure disturbances amplitudes: absolute levels are not needed. This circumstance relaxes the requirements that must be placed on the transducers T1 and T2.

(b) Reflection coefficient determination

The expression given in the preceding paragraph contains the relection coefficient $\underline{R}$ which must be determined prior to the measurement. The procedure is as follows:

A beeper not located at the center of elongated cavity, i.e. either B1 or B3, is activated. Either beeper represents a sound source of known location s. Next the amplitude ratio Q is determined, which allows the calculation of R from the expression:

$$R = \frac{e^{-ivs} - Qe^{ivs}}{Qe^{-ivs(s-2)} - e^{iv(s+2)}}$$

The value of s used in this equation must correspond to the location of the beeper used. The R values obtained using the two beepers should be equal within acceptable tolerance, even if the sound intensities delivered by the two beepers differ.

The value of R obtained is constant and valid for the chamber during the next shock position indicating operation. Although the value of R may be taken as characteristic of the elongated cavity 53, it is best to recalibrate before each operation to account for gradual changes in the apparatus over time as a result of age and wear. This calibration may be performed in situ and can be fully automated under microprocessor control.

(a) Transducer gain ratio determination

Operation in modes (b) and (c) requires the ratio of pressure disturbance amplitudes. The measurement of this ratio requires the knowledge of the ratio of gains for the two transducers T1 and T2. The ratio of gains can be determined as follows:

When no fluid is flowing in duct 11, activate beeper B2 located at the center of elongated cavity 53 and measure the ratio of signals, Q, for this condition. The sound at transducers T1 and T2 should have the same amplitude and phase, i.e., Q should be real and equal to 1. The actually measured Q (designated as Qcal) indicates the ratio of gains and any phase shift that might be introduced in the transducers.

The imbalances of the transducer gains are thus accounted for if the Q values measured in modes a anb b are replaced by Q/Qcal.

When the shock position indicator is driven by a shock, it is convenient to narrow-band filter the signals from T1 and T2 such that the information obtainable from a single frequency calibration is directly applicable to system operation. The process would then amount to the determination of the amplitude ratio and phase delay between the two signals. The theory of the method implies that a unique value of the shock position is obtainable if the operating frequency f is less than (a/4L) hertz. This limit is usually well above the expected dominant frequencies for the shock oscillations and can be observed without difficulty.

The streamwise spacing of the connecting tubes 55 at the cavity end need not be the same as the spacing on the inner wall 51 of the duct. It is admissible to choose a cavity length that is significantly less than the range of shock positions in the duct. As long as the length of all connecting tubes is the same, the operation of the system is independent of the cavity length. Such a scaling-down of the cavity would increase the upper limit for the allowable operating frequencies.

Also, subject to the condition of having signal length connecting tubes, the orientation of the cavity may be chosen freely; it need not be parallel to the flow or the wall.

Referring to FIG. 3, a diagram of the system incorporating the shock position apparatus of FIG. 2 into a shock location system is shown. Here a multiplexer 63 is shown connected to pressure transducer T1 and T2 and to thermocouple 61. The multiplexer 63 makes the information from pressure transducers T1 and T2 and thermocouple 61 available to an analog to digital converter 65. Analog to digital converter 65 provides digitized information about pressure transducers T1 and T2 and thermocouple 61 to a central processing unit 67. Central processing unit 67 may be any type of computer, such as a microprocessor.

In calculating the position of the shock, the speed of sound in air as a function of temperature may be computed according to the relationship disclosed above. The information relating to the position of the shock computed by central processing unit 67 may be used, with or without other data, to control means affecting the flow of fluid within duct 11. This includes, and is not limited to, the control of a power plant on an aircraft.

The foregoing disclosure and description of the invention are illustrative and explanatory thereof, and various changes in the scale, materials, and orientation, as well as in the details of the illustrated construction may be made without departing from the spirit and scope of the invention.

We claim:

1. A shock position indicating apparatus comprising:
   inlet means for containing the said shock to be measured;
   multiplicity of tube means, opening into said inlet means, for providing pressure communication with said inlet means;
   cavity means for receiving pressure fluctuations, connected to said multiplicity of tube means;
   pressure transduction means, located near the ends of said cavity means, for sensing pressure fluctuations in said cavity means; and,
   tone means, adjacent said cavity means, for producing an acoustic tone within said cavity means.

2. The shock position indicating apparatus of claim 1 further comprising temperature indication means, adjacent said cavity means, for measuring the temperature within said cavity means.

3. The shock position indicating apparatus of claim 2 wherein said temperature indication means is a thermocouple.

4. A shock position indicating system with the shock position indicating apparatus recited in claim 2 and further comprising means for computing shock position, connected to said pressure transduction means and said temperature indicating means.

5. A shock position indicating system with the shock position indicating apparatus recited in claim 2 and further comprising:
   means for sampling said pressure transduction means and said temperature indicating means; and,
   means for computing shock position, connected to said means for sampling.

6. The shock position indicating apparatus of claim 1 further comprising termination means, within said cavity means, for reducing the acoustic reflectivity within said cavity means.

7. The shock position indicating apparatus of claim 1 wherein said pressure transduction means are located equally distant from the center of said cavity means.

8. The shock position indicating apparatus of claim 1 wherein said cavity means has an elongated shape, and wherein said pressure transduction means further comprises:
   a first pressure transducer located adjacent the inner surface near one end of said cavity means; and,
   a second pressure transducer located adjacent the inner surface near the other end of said cavity means.

9. The shock position indicating apparatus of claim 8 wherein said tone means further comprises:
   a first beeper located adjacent the inner surface of and at the center of said cavity means; and
   a second beeper located adjacent the inner surface of said cavity means between said first beeper and said first pressure transducer.

10. The shock position indicating apparatus of claim 9 further comprising termination means, within said cavity means, for reducing the acoustic reflectivity within said cavity means.

11. The shock position indicating apparatus of claim 9 wherein said tone means further comprises:
   a third beeper located adjacent the inner surface of said cavity means between said first beeper and said second pressure transducer.

12. A shock position indicating apparatus comprising:
   an elongate inlet;
   multiplicity of connecting tubes having axes colinear to each other and perpendicular to the axis of said elongate inlet and one end of each said connecting tube opening into said elongate inlet;
   an elongate cavity, the other end of each of said multiplicity of connecting tubes opening into said elongate cavity;
   a first pressure transducer located adjacent the inner surface, opening into, and near one end of said elongate cavity;
   a second pressure transducer located adjacent the inner surface, opening into, and near the other end of said elongate cavity;
   a first beeper located at the inner surface of and at the axial center of said elongate cavity;
   a second beeper located at the inner surface of said cavity means half way between the axial center of said elongate cavity and the axial location of said first pressure transducer; and,
   a third beeper located at the inner surface of said cavity means half way between the axial center of said elongate cavity and the axial location of said second pressure transducer;
   a thermocouple within said elongate cavity;
   a first acoustic reflectivity reduction termination at one end of said elongate cavity; and,
   a second acoustic reflectivity reduction termination at the other end of said elongate cavity.

13. A shock position indicating system with the shock position indicating apparatus recited in claim 12 and further comprising:
   a multiplexer having a first input connected to said first pressure transducer, a second input connected to said second pressure transducer, and a third input connected to said thermocouple;
   an analog to digital converter connected to said multiplexer; and
   means for computing, connected to said analog to digital converter.

14. The process of determining the position of a shock within an inlet comprising the steps of:
   flowing a gaseous fluid in an inlet;
   transmitting the pressure fluctuation, through a series of tubes, from said flowing gaseous fluid in said inlet to an elongate cavity;
   measuring the instantaneous pressure at the opposite ends of and at points equidistant from the center of said elongate cavity;
   measuring the temperature within said elongate cavity; and,
   computing the position of the shock utilizing said measured pressure and said temperature.

15. The process of claim 14 wherein said computing step further comprises the steps of:
   ascertaining the ratio of said measured instantaneous pressure, Q, aft the ends of an elongate cavity under conditions of calibration;
   ascertaining the speed of sound corresponding to the measured temperature;
   computing the quantity ratio R using said Q obtained under conditions of calibration, by the relationship $$R = \frac{e^{(-iwx/a)} - Qe^{(+iwx/a)}}{Qe^{((-iwL/a)((x/L)-2)} - e^{((+iwL/a)((x/L)+2)}}$$

computing the position of the shock under operating conditions, using the ratio of said measured instantaneous pressure, Q, at the ends of an elongate cavity under conditions of operation, according the relationship:

$$\frac{(1 - QRe^{(i2wL/a)})}{(Q - Re^{(i2wL/a)})}$$

16. The process of claim 15 wherein said ascertaining the speed of sound step is performed according to the following equation:

$$a = \sqrt{\gamma RT}$$

17. The process of claim 15 wherein said computing the position of he shock step is performed repeatedly.

18. The process of claim 17 wherein said position of said shock is used in controlling the propulsion system on an aircraft.

19. The process of claim 14 wherein said flowing a gaseous fluid in an inlet step is accomplished by flowing inlet air into the air intakes of an aircraft.

20. The process of claim 14 wherein said measuring the temperature step further comprises the step of measuring the voltage potential of a thermocouple.

21. The process of claim 14 wherein said measuring the instantaneous pressure step further comprises the step of measuring the electronic output of an electronic pressure transducer.

* * * * *